(No Model.)
W. M. MYERS.
WHIFFLETREE CLIP.
No. 492,630. Patented Feb. 28, 1893.
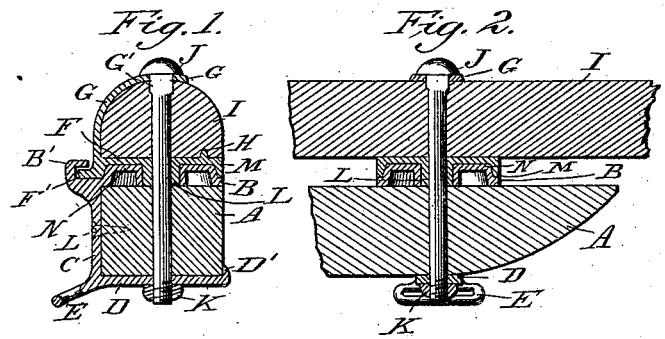
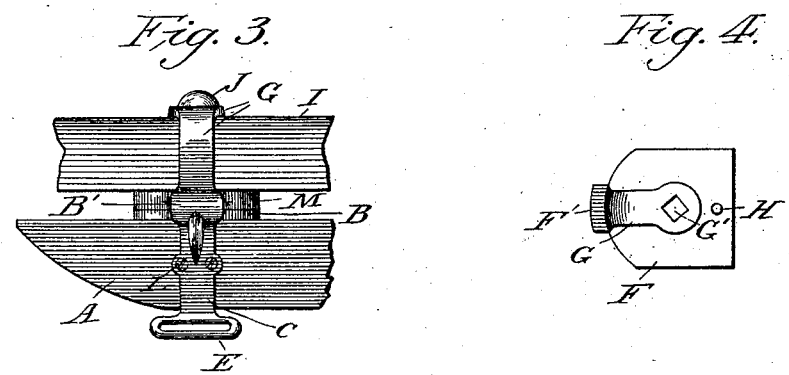
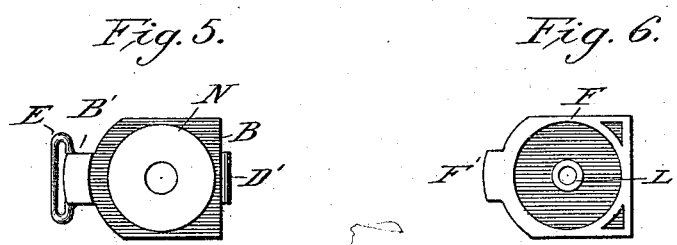
Witnesses:
Geo. W. Hinton
James M. Rogers
Inventor:
William M. Myers

UNITED STATES PATENT OFFICE.

WILLIAM M. MYERS, OF COSBY, MISSOURI.

WHIFFLETREE-CLIP.

SPECIFICATION forming part of Letters Patent No. 492,630, dated February 28, 1893.

Application filed September 28, 1891. Serial No. 407,078. (No model.)

*To all whom it may concern:*

Be it known that I, WILLIAM M. MYERS, a citizen of the United States, residing at Cosby, in the county of Andrew and State of Missouri, have invented certain new and useful Improvements in Whiffletree-Clips for Eveners, &c., of which the following is a specification.

This invention is an improvement on the devices shown in Patent No. 436,429 issued to myself, September 16, 1890.

My invention relates to improvements in whiffle tree clips by which the singletree of a vehicle is pivotally attached to its suitable support; and the objects of my improvements are, first to provide a whiffle tree clip which shall substantially secure the whiffle tree to the double tree or the cross bar of a vehicle in such a manner that said whiffle tree may rotate freely on its pivotal fastenings; second, to so construct said whiffle tree clip that the whiffle tree can not be drawn forward from said double tree or cross bar, thereby preventing the wearing of oblong holes in either the whiffle tree or double tree or the cross bar; third, to so construct said clip that it may be easily and quickly attached to or removed from said whiffle tree and double tree or cross bar; and so that said clip may be readily adjusted, to take up lost motion; fourth, to so arrange the different parts of said clip that it shall be strong and durable, light in weight and cheap in cost of manufacture. I attain these objects by the mechanism illustrated in the accompanying drawings, in which—

Figure 1 is a vertical cross section on the line of the pivotal bolt at the end of the doubletree and the center of the singletree. Fig. 2 is a central longitudinal section through the double tree and singletree. Fig. 3 is a rear view of my invention. Fig. 4 is a top plan of upper bearing plate and the parts formed therewith. Fig. 5 is a top plan of lower bearing plate and parts formed therewith. Fig. 6 is a bottom plan of upper bearing plate.

Similar letters refer to similar parts throughout the several views.

The lower bearing plate B, the hook B', the plates C and D, projecting lug D', and the loop E are preferably formed of one piece, said piece being attached to and passing partially around the end of double tree A as seen in Fig. 1. The upper bearing plate F, its extending lug F', the curved plate G, and the stud H are preferably formed of one piece, said piece being attached to and passing partially around the center of singletree I. The pivotal bolt J, passing downward through square hole G', in curved plate G, through singletree I, upper bearing plate F, lower bearing plate B, double tree A, plate D and threaded nut K, secures together the above described parts, as seen in Figs. 1 and 2.

By tightening nut K on pivotal bolt J lost motion in the working parts may be taken up, thus forming an easy means of adjustment. The extending lug D', passing upward in front of lower corner of double tree A, and the two screws L passing through plate C into rear of doubletree A, form additional means of securing plates C and D and lower bearing plate B, (being formed therewith) to double tree A; see Figs. 1 and 3.

The stud H, on upper bearing plate F, passing upward into bottom of singletree I forms an additional means of securing upper bearing plate F to single tree I, and also prevents any lateral motion of single tree I on bearing plate F.

The upper bearing plate F has two annular projections L and M, leaving an annular groove between them into which fits an annular projection N on lower bearing plate. The projection L fits into an aperture in the center of the projection N and receives the pivotal bolt J. This arrangement of the projections on the wearing surfaces of the bearing plates excludes all grit from said surfaces and provides an extremely strong and durable pivotal arrangement. Single tree I being pivotally held in place as described, is prevented from being drawn over, or tipped forward by means of lug F' operated in hook B', see Fig. 1.

The extending loop or eye E is arranged for the reception of a stay strap; see Figs. 1 and 3.

From the above description and the drawings it will be seen that, excepting the inexpensive (preferably wrought) bolt J, threaded nut K and the two ordinary screws L, my invention consists preferably of but two pieces comparatively light in weight and being preferably of malleable iron castings it is therefore cheap in cost of manufacture, simple in construction, easy of attachment and very strong and durable.

While I have shown and described my invention in the foregoing manner, it is evident that these devices may be used for securing a whiffle tree to the cross-bar between shafts where a double tree is not used, and I should consider in such cases such cross-bar as the equivalent of the double tree A.

Having fully described my invention, what I claim as new and original, and desire to secure by Letters Patent, is—

The herein shown and described whiffletree clip composed of the upper bearing plate having depending collar L and annular projection M, stud H, lip F', and having the curved arm G, the lower bearing plate having central opening to receive the collar L, annular projection N to fit snugly within the annular space formed between the collar L and the projection M, the hook B' to embrace the lip F', the plates L and D, the projection D', and having the loop E at the angle of the two plates C and D, and a bolt to pass through the arm G, collar L and plate D to secure the parts together substantially as set forth.

WILLIAM M. MYERS.

Witnesses:
GEO. W. HINTON,
JAS. M. ROGERS.